United States Patent [19] [11] 3,971,268
Murakami et al. [45] July 27, 1976

[54] SPEED CHANGE GEAR SYSTEM
[75] Inventors: Noboru Murakami, Nagoya; Koichiro Hirosawa, Kariya; Koichi Matsuo; Kazuo Ohara, both of Toyota, all of Japan
[73] Assignee: Aisin Seiki Kabushiki Kaisha, Japan
[22] Filed: Oct. 11, 1974
[21] Appl. No.: 514,068

[30] Foreign Application Priority Data
Oct. 11, 1973  Japan.............................. 48-114097

[52] U.S. Cl................................ 74/759; 74/753; 74/767; 74/769; 74/770
[51] Int. Cl.² ....................................... F16H 57/10
[58] Field of Search ............ 74/759, 758, 753, 766, 74/767, 769, 770, 768

[56] References Cited
UNITED STATES PATENTS
3,067,632  12/1962  Foerster et al........................ 74/759
3,823,622  7/1974  Mori et al.............................. 74/759

Primary Examiner—Samuel Scott
Assistant Examiner—Lance W. Chandler
Attorney, Agent, or Firm—Oblon, Fisher, Spivak, McClelland & Maier

[57] ABSTRACT
A speed change gear system includes an input shaft, an output shaft and three planetary gear sets interposed therebetween. The first planetary gear set includes a first sun gear, a first planetary gear intermeshed with the first sun gear, a first ring gear enmeshed with the first planetary gear, and a first carrier rotatably supporting the first planetary gear while the second planetary gear set includes a second sun gear, a second planetary gear enmeshed with the second sun gear, a second ring gear intermeshed with the second planetary gear and drivingly connected to the first carrier, and a second carrier rotatably supporting the second planetary gear. The third planetary gear set similarly includes a third sun gear drivingly connected to the second sun gear, a third planetary gear interengaged with the third sun gear, a third ring gear enmeshed with the third planetary gear and drivingly connected to the second carrier and the first ring gear, and a third carrier rotatably supporting the third planetary gear and drivingly connected to the output shaft. A first clutch is provided for engaging or disengaging the input shaft with the first ring gear, the second carrier, and the third ring gear, and a second clutch is similarly provided for engaging or disengaging the input shaft with the first carrier and the second ring gear while a third clutch is additionally provided for engaging or disengaging the input shaft with the first sun gear. A first brake is also provided for fixedly securing the first sun gear relative to the gear casing while a second brake is similarly provided for fixedly securing the first ring gear, the second carrier, and the third ring gear to the casing, and a third brake is also provided for fixedly securing the second and third sun gears to the casing.

15 Claims, 27 Drawing Figures

FIG.1B

|     | CL1 | CL2 | CL3 | B1 | B2 | B3 |     | GEAR RATIO |
|-----|-----|-----|-----|----|----|----|-----|------------|
| F1  |     |     | ○   |    |    | ○  |     | 3.33       |
| F2  |     | ○   |     |    |    | ○  |     | 2.01       |
| F3  | ○   |     |     |    |    | ○  |     | 1.42       |
| F4  | ○   | ○   |     |    |    |    |     | 1.00       |
| F5  | ○   |     |     | ○  |    |    |     | 0.82       |
| F6  |     | ○   |     | ○  |    |    |     | 0.57       |
| R1  |     |     | ○   |    | ○  |    |     | -4.56      |
| R2  |     | ○   |     |    | ○  |    |     | -1.42      |

FIG.2B

|     | CL1 | CL2 | CL3 | B1 | B2 | B3 | B4 | GEAR RATIO |
|-----|-----|-----|-----|----|----|----|----|------------|
| F1  |     |     | ○   |    |    |    | ○  | 4.64       |
| F2  |     |     | ○   |    |    | ○  |    | 3.33       |
| F3  |     | ○   |     |    |    |    | ○  | 2.58       |
| F4  |     | ○   |     |    |    | ○  |    | 2.01       |
| F5  | ○   |     |     |    |    |    | ○  | 1.65       |
| F6  | ○   |     |     |    |    | ○  |    | 1.42       |
| F7  | ○   | ○   |     |    |    |    |    | 1.00       |
| F8  | ○   |     |     | ○  |    |    |    | 0.82       |
| F9  |     | ○   |     | ○  |    |    |    | 0.57       |
| R1  |     |     | ○   |    | ○  |    |    | -4.56      |
| R2  |     | ○   |     |    | ○  |    |    | -1.42      |

FIG.3B

|  | CL1 | CL2 | CL3 | B1 | B2 | B3 | B4 | GEAR RATIO |
|---|---|---|---|---|---|---|---|---|
| F1 |  |  | ○ |  |  |  | ○ | 7.47 |
| F2 |  | ○ |  |  |  |  | ○ | 3.82 |
| F3 |  |  | ○ |  |  | ○ |  | 3.33 |
| F4 | ○ |  |  |  |  |  | ○ | 2.17 |
| F5 |  | ○ |  |  |  | ○ |  | 2.01 |
| F6 | ○ |  |  |  |  | ○ |  | 1.42 |
| F7 | ○ | ○ |  |  |  |  |  | 1.00 |
| F8 | ○ |  |  | ○ |  |  |  | 0.82 |
| F9 |  | ○ |  | ○ |  |  |  | 0.57 |
| R1 |  |  | ○ |  | ○ |  |  | -4.56 |
| R2 |  | ○ |  |  | ○ |  |  | -1.42 |

FIG.4B

|  | CL1 | CL2 | CL3 | B1 | B2 | B3 | B4 | GEAR RATIO |
|---|---|---|---|---|---|---|---|---|
| F1 |  |  | ○ |  |  | ○ |  | 3.33 |
| F2 |  | ○ |  |  |  | ○ |  | 2.01 |
| F3 |  |  | ○ |  |  |  | ○ | 1.84 |
| F4 | ○ |  |  |  |  | ○ |  | 1.42 |
| F5 |  | ○ |  |  |  |  | ○ | 1.37 |
| F6 | ○ |  |  |  |  |  | ○ | 1.15 |
| F7 | ○ | ○ |  |  |  |  |  | 1.00 |
| F8 | ○ |  |  | ○ |  |  |  | 0.82 |
| F9 |  | ○ |  | ○ |  |  |  | 0.57 |
| R1 |  |  | ○ |  | ○ |  |  | -4.56 |

FIG. 5B

|     | CL1 | CL2 | CL3 | B1 | B2 | B3 | B4 | GEAR RATIO |
|-----|-----|-----|-----|----|----|----|----|------------|
| F1  |     |     | ○   |    |    | ○  |    | 3.33       |
| F2  |     |     | ○   |    |    |    | ○  | 2.49       |
| F3  |     | ○   |     |    |    | ○  |    | 2.01       |
| F4  |     | ○   |     |    |    |    | ○  | 1.65       |
| F5  | ○   |     |     |    |    | ○  |    | 1.42       |
| F6  | ○   |     |     |    |    |    | ○  | 1.27       |
| F7  | ○   | ○   |     |    |    |    |    | 1.00       |
| F8  | ○   |     |     | ○  |    |    |    | 0.82       |
| F9  |     | ○   |     | ○  |    |    |    | 0.57       |
| R1  |     |     | ○   |    | ○  |    |    | −4.56      |
| R2  |     | ○   |     |    | ○  |    |    | −1.42      |

FIG. 6B

|     | CL1 | CL2 | CL3 | B1 | B2 | B3 | B4 | GEAR RATIO |
|-----|-----|-----|-----|----|----|----|----|------------|
| F1  |     |     | ○   |    |    | ○  |    | 3.33       |
| F2  |     | ○   |     |    |    | ○  |    | 2.01       |
| F3  | ○   |     |     |    |    | ○  |    | 1.42       |
| F4  | ○   | ○   |     |    |    |    |    | 1.00       |
| F5  | ○   |     |     | ○  |    |    |    | 0.82       |
| F6  |     | ○   |     | ○  |    |    |    | 0.57       |
| R1  |     |     | ○   |    | ○  |    |    | −4.56      |
| R2  |     |     | ○   |    |    |    | ○  | −4.33      |
| R3  |     | ○   |     |    | ○  |    |    | −1.42      |
| R4  |     | ○   |     |    |    |    | ○  | −1.32      |

FIG. 7B

|     | CL1 | CL2 | CL3 | B1 | B2 | B3 | B4 | GEAR RATIO |
|-----|-----|-----|-----|-----|-----|-----|-----|------------|
| F1  |     |     | ○   |     |     | ○   |     | 3.33       |
| F2  |     | ○   |     |     |     | ○   |     | 2.01       |
| F3  | ○   |     |     |     |     | ○   |     | 1.42       |
| F4  | ○   | ○   |     |     |     |     |     | 1.00       |
| F5  | ○   |     |     | ○   |     |     |     | 0.82       |
| F6  | ○   |     |     |     |     |     | ○   | 0.77       |
| F7  |     | ○   |     | ○   |     |     |     | 0.57       |
| R1  |     |     | ○   |     | ○   |     |     | −4.56      |

FIG. 8B

|     | CL1 | CL2 | CL3 | B1 | B2 | B3 | B4 | GEAR RATIO |
|-----|-----|-----|-----|-----|-----|-----|-----|------------|
| F1  |     |     | ○   |     |     | ○   |     | 3.33       |
| F2  |     | ○   |     |     |     | ○   |     | 2.01       |
| F3  |     | ○   |     |     |     |     | ○   | 1.67       |
| F4  | ○   |     |     |     |     | ○   |     | 1.42       |
| F5  | ○   |     |     |     |     |     | ○   | 1.28       |
| F6  | ○   | ○   |     |     |     |     |     | 1.00       |
| F7  | ○   |     |     | ○   |     |     |     | 0.82       |
| F8  |     | ○   |     | ○   |     |     |     | 0.57       |
| R1  |     |     | ○   |     | ○   |     |     | −4.56      |
| R2  |     | ○   |     |     | ○   |     |     | −1.42      |

|     | CL1 | CL2 | CL3 | B1 | B2 | B3 | B4 | GEAR RATIO |
|-----|-----|-----|-----|----|----|----|----|-----------|
| F1  |     |     | ○   |    |    |    | ○  | 20.85 |
| F2  |     | ○   |     |    |    |    | ○  | 9.64  |
| F3  |     |     | ○   |    |    | ○  |    | 3.33  |
| F4  |     | ○   |     |    |    | ○  |    | 2.01  |
| F5  | ○   |     |     |    |    | ○  |    | 1.42  |
| F6  | ○   | ○   |     |    |    |    |    | 1.00  |
| F7  | ○   |     |     | ○  |    |    |    | 0.82  |
| F8  |     | ○   |     | ○  |    |    |    | 0.57  |
| R1  |     |     | ○   |    | ○  |    |    | -4.56 |
| R2  |     | ○   |     |    | ○  |    |    | -1.42 |

FIG.1C

| A | B | X1 | | | | X2 | | | | | X3 | | | |
|---|---|------|------|-------|------|------|------|------|------|------|------|------|------|------|
|   |   | S1   | C1   | RG1   | P1   | S2   | C2   | RG2  | P2   | S3   | C3   | RG3  | P3   |
| F1 | N | 1.00 | 0.60 | 0.43 | -0.65 | 0.0 | 0.43 | 0.60 | 0.61 | 0.0 | 0.30 | 0.43 | 0.43 |
|    | W | 2.21 | 4.42 | 2.21 | 2.21 | 3.21 | 6.42 | 3.21 | 3.21 | 2.35 | 4.69 | 2.35 | 2.35 |
| F2 | N | 1.65 | 1.00 | 0.70 | -1.08 | 0.0 | 0.70 | 1.00 | 1.02 | 0.0 | 0.50 | 0.70 | 0.72 |
|    | W | 0.0  | 0.00 | 0.00 | 0.00 | 1.00 | 2.00 | 1.00 | 1.00 | 1.42 | 2.84 | 1.42 | 1.42 |
| F3 | N | 2.35 | 1.42 | 1.00 | -1.53 | 0.0 | 1.00 | 1.42 | 1.44 | 0.0 | 0.70 | 1.00 | 1.02 |
|    | W | 0.0  | 0.00 | 0.00 | 0.00 | 0.00 | 0.00 | 0.00 | 0.00 | 1.00 | 2.00 | 1.00 | 1.00 |
| F5 | N | 0.0  | 0.69 | 1.00 | 1.14 | 1.74 | 1.00 | 0.69 | -1.07 | 1.74 | 1.22 | 1.00 | -0.76 |
|    | W | 0.40 | 0.80 | 0.40 | 0.40 | 0.58 | 1.16 | 0.58 | 0.58 | 0.58 | 1.16 | 0.58 | 0.58 |
| F6 | N | 0.0  | 1.00 | 1.45 | 1.65 | 2.53 | 1.45 | 1.00 | -1.56 | 2.53 | 1.77 | 1.45 | -1.10 |
|    | W | 0.96 | 1.93 | 0.96 | 0.96 | 0.40 | 0.80 | 0.40 | 0.40 | 0.40 | 0.80 | 0.40 | 0.40 |
| R1 | N | 1.00 | 0.31 | 0.0  | -1.14 | -0.74 | 0.0 | 0.31 | 1.07 | -0.74 | -0.22 | 0.00 | 0.76 |
|    | W | 2.21 | 4.42 | 2.21 | 2.21 | 3.21 | 6.42 | 3.21 | 3.21 | 3.21 | 6.42 | 3.21 | 3.21 |
| R2 | N | 3.21 | 1.00 | 0.0  | -3.65 | -2.39 | 0.00 | 1.00 | 3.44 | -2.39 | -0.70 | 0.0 | 2.43 |
|    | W | 0.0  | 0.00 | 0.00 | 0.00 | 1.00 | 2.00 | 1.00 | 1.00 | 1.00 | 2.00 | 1.00 | 1.00 |

FIG.2C

| A | B | X1 | | | | X2 | | | | X3 | | | | X4 | | | |
|---|---|----|----|----|----|----|----|----|----|----|----|----|----|----|----|----|----|
|   |   | S1 | C1 | RG1 | P1 | S2 | C2 | RG2 | P2 | S3 | C3 | RG3 | P3 | S4 | C4 | RG4 | P4 |
| F1 | N | 1.00 | 0.56 | 0.36 | -0.73 | -0.12 | 0.36 | 0.56 | 0.69 | -0.12 | 0.22 | 0.36 | 0.49 | 0.22 | 0.00 | -0.12 | -0.55 |
| F1 | W | 2.21 | 4.42 | 2.21 | 2.21 | 3.21 | 6.42 | 3.21 | 3.21 | 2.35 | 4.69 | 2.35 | 2.35 | 2.33 | 4.66 | 2.33 | 2.33 |
| F2 | N | 1.00 | 0.60 | 0.43 | -0.65 | 0.0 | 0.43 | 0.60 | 0.61 | 0.0 | 0.30 | 0.43 | 0.43 | 0.30 | 0.11 | 0.0 | -0.49 |
| F2 | W | 2.21 | 4.42 | 2.21 | 2.21 | 3.21 | 6.42 | 3.21 | 3.21 | 2.35 | 4.69 | 2.35 | 2.35 | 0.0 | 0.0 | 0.0 | 0.0 |
| F3 | N | 1.80 | 1.00 | 0.64 | -1.31 | -0.22 | 0.64 | 1.00 | 1.24 | -0.22 | 0.39 | 0.64 | 0.87 | 0.39 | 0.00 | -0.22 | -0.99 |
| F3 | W | 0.0 | 0.00 | 0.00 | 0.00 | 1.00 | 2.00 | 1.00 | 1.00 | 1.42 | 2.84 | 1.42 | 1.42 | 1.01 | 2.03 | 1.01 | 1.01 |
| F4 | N | 1.65 | 1.00 | 0.70 | -1.08 | 0.0 | 0.70 | 1.00 | 1.02 | 0.0 | 0.50 | 0.70 | 0.72 | 0.50 | 0.18 | 0.0 | -0.82 |
| F4 | W | 0.0 | 0.00 | 0.00 | 0.00 | 1.00 | 2.00 | 1.00 | 1.00 | 1.42 | 2.84 | 1.42 | 1.42 | 0.0 | 0.0 | 0.0 | 0.0 |
| F5 | N | 2.80 | 1.56 | 1.00 | -2.05 | -0.34 | 1.00 | 1.56 | 1.93 | -0.34 | 0.60 | 1.00 | 1.36 | 0.60 | 0.00 | -0.34 | -1.55 |
| F5 | W | 0.0 | 0.00 | 0.00 | 0.00 | 0.00 | 0.00 | 0.00 | 0.00 | 1.00 | 2.00 | 1.00 | 1.00 | 0.42 | 0.84 | 0.42 | 0.42 |
| F6 | N | 2.35 | 1.42 | 1.00 | -1.53 | 0.0 | 1.00 | 1.42 | 1.44 | 0.0 | 0.70 | 1.00 | 1.02 | 0.70 | 0.25 | 0.0 | -1.16 |
| F6 | W | 0.0 | 0.00 | 0.00 | 0.00 | 0.00 | 0.00 | 0.00 | 0.00 | 1.00 | 2.00 | 1.00 | 1.00 | 0.0 | 0.0 | 0.0 | 0.0 |
| F8 | N | 0.0 | 0.69 | 1.00 | 1.14 | 1.74 | 1.00 | 0.69 | -1.07 | 1.74 | 1.22 | 1.00 | -0.76 | 1.22 | 1.55 | 1.74 | 0.86 |
| F8 | W | 0.40 | 0.80 | 0.40 | 0.40 | 0.58 | 1.16 | 0.58 | 0.58 | 0.58 | 1.16 | 0.58 | 0.58 | 0.0 | 0.0 | 0.0 | 0.0 |
| F9 | N | 0.0 | 1.00 | 1.45 | 1.65 | 2.53 | 1.45 | 1.00 | -1.56 | 2.53 | 1.77 | 1.45 | -1.10 | 1.77 | 2.26 | 2.53 | 1.25 |
| F9 | W | 0.96 | 1.93 | 0.96 | 0.96 | 0.40 | 0.80 | 0.40 | 0.40 | 0.40 | 0.80 | 0.40 | 0.40 | 0.0 | 0.0 | 0.0 | 0.0 |
| R1 | N | 1.00 | 0.31 | 0.0 | -1.14 | -0.74 | 0.0 | 0.31 | 1.07 | -0.74 | -0.22 | 0.0 | 0.76 | -0.22 | -0.55 | -0.74 | -0.86 |
| R1 | W | 2.21 | 4.42 | 2.21 | 2.21 | 3.21 | 6.42 | 3.21 | 3.21 | 3.21 | 6.42 | 3.21 | 3.21 | 0.0 | 0.0 | 0.0 | 0.0 |
| R2 | N | 3.21 | 1.00 | 0.0 | -3.65 | -2.39 | 0.0 | 1.00 | 3.44 | -2.39 | -0.70 | 0.00 | 2.43 | -0.70 | -1.78 | -2.39 | -2.76 |
| R2 | W | 0.0 | 0.00 | 0.00 | 0.00 | 1.00 | 2.00 | 1.00 | 1.00 | 1.00 | 2.00 | 1.00 | 1.00 | 0.0 | 0.0 | 0.0 | 0.0 |

FIG.3C

| A | B | X1 | | | | X2 | | | | X3 | | | | X4 | | | |
|---|---|------|------|------|------|------|------|------|------|------|------|------|------|------|------|------|------|
|   |   | S1 | C1 | RG1 | P1 | S2 | C2 | RG2 | P2 | S3 | C3 | RG3 | P3 | S4 | C4 | RG4 | P4 |
| F1 | N | 1.00 | 0.51 | 0.29 | -0.81 | -0.24 | 0.29 | 0.51 | 0.76 | -0.24 | 0.13 | 0.29 | 0.54 | -0.24 | 0.00 | 0.13 | 0.61 |
| F1 | W | 2.21 | 4.42 | 2.21 | 2.21 | 3.21 | 6.42 | 3.21 | 3.21 | 2.35 | 4.69 | 2.35 | 2.35 | 4.14 | 8.29 | 4.14 | 4.14 |
| F2 | N | 1.96 | 1.00 | 0.57 | -1.58 | -0.47 | 0.57 | 1.00 | 1.49 | -0.47 | 0.26 | 0.57 | 1.05 | -0.47 | 0.00 | 0.26 | 1.20 |
| F2 | W | 0.0 | 0.00 | 0.00 | 0.00 | 1.00 | 2.00 | 1.00 | 1.00 | 1.42 | 2.84 | 1.42 | 1.42 | 1.80 | 3.61 | 1.80 | 1.80 |
| F3 | N | 1.00 | 0.60 | 0.43 | -0.65 | 0.0 | 0.43 | 0.60 | 0.61 | 0.0 | 0.30 | 0.43 | 0.43 | 0.0 | 0.19 | 0.30 | 0.49 |
| F3 | W | 2.21 | 4.42 | 2.21 | 2.21 | 3.21 | 6.42 | 3.21 | 3.21 | 2.35 | 4.69 | 2.35 | 2.35 | 0.0 | 0.0 | 0.0 | 0.0 |
| F4 | N | 3.45 | 1.76 | 1.00 | -2.79 | -0.82 | 1.00 | 1.76 | 2.63 | -0.82 | 0.46 | 1.00 | 1.85 | -0.82 | 0.0 | 0.46 | 2.11 |
| F4 | W | 0.0 | 0.0 | 0.0 | 0.0 | 0.0 | 0.0 | 0.0 | 0.0 | 1.00 | 2.00 | 1.00 | 1.00 | 0.75 | 1.49 | 0.75 | 0.75 |
| F5 | N | 1.65 | 1.00 | 0.70 | -1.08 | 0.0 | 0.70 | 1.00 | 1.02 | 0.0 | 0.50 | 0.70 | 0.72 | 0.0 | 0.32 | 0.50 | 0.82 |
| F5 | W | 0.0 | 0.00 | 0.00 | 0.00 | 1.00 | 2.00 | 1.00 | 1.00 | 1.42 | 2.84 | 1.42 | 1.42 | 0.0 | 0.0 | 0.0 | 0.0 |
| F6 | N | 2.35 | 1.42 | 1.00 | -1.53 | 0.0 | 1.00 | 1.42 | 1.44 | 0.0 | 0.70 | 1.00 | 1.02 | 0.0 | 0.45 | 0.70 | 1.16 |
| F6 | W | 0.0 | 0.00 | 0.00 | 0.00 | 0.00 | 0.00 | 0.00 | 0.00 | 1.00 | 2.00 | 1.00 | 1.00 | 0.0 | 0.0 | 0.0 | 0.0 |
| F8 | N | 0.0 | 0.69 | 1.00 | 1.14 | 1.74 | 1.00 | 0.69 | -1.07 | 1.74 | 1.22 | 1.00 | -0.76 | 1.74 | 1.41 | 1.22 | -0.86 |
| F8 | W | 0.40 | 0.80 | 0.40 | 0.40 | 0.58 | 1.16 | 0.58 | 0.58 | 0.58 | 1.16 | 0.58 | 0.58 | 0.00 | 0.00 | 0.00 | 0.00 |
| F9 | N | 0.0 | 1.00 | 1.45 | 1.65 | 2.53 | 1.45 | 1.00 | -1.56 | 2.53 | 1.77 | 1.45 | -1.10 | 2.53 | 2.04 | 1.77 | -1.25 |
| F9 | W | 0.96 | 1.93 | 0.96 | 0.96 | 0.40 | 0.80 | 0.40 | 0.40 | 0.40 | 0.80 | 0.40 | 0.40 | 0.00 | 0.00 | 0.00 | 0.00 |
| R1 | N | 1.00 | 0.31 | 0.0 | -1.14 | -0.74 | 0.00 | 0.31 | 1.07 | -0.74 | -0.22 | 0.00 | 0.76 | -0.74 | -0.41 | -0.22 | 0.86 |
| R1 | W | 2.21 | 4.42 | 2.21 | 2.21 | 3.21 | 6.42 | 3.21 | 3.21 | 3.21 | 6.42 | 3.21 | 3.21 | 0.00 | 0.00 | 0.00 | 0.00 |
| R2 | N | 3.21 | 1.00 | 0.0 | -3.65 | -2.39 | 0.00 | 1.00 | 3.44 | -2.39 | -0.70 | 0.00 | 2.43 | -2.39 | -1.31 | -0.70 | 2.76 |
| R2 | W | 0.0 | 0.00 | 0.00 | 0.00 | 1.00 | 2.00 | 1.00 | 1.00 | 1.00 | 2.00 | 1.00 | 1.00 | 0.00 | 0.00 | 0.00 | 0.00 |

FIG.4C

| A | B | X1 | | | | X2 | | | | X3 | | | | X4 | | | |
|---|---|---|---|---|---|---|---|---|---|---|---|---|---|---|---|---|---|
| | | S1 | C1 | RG1 | P1 | S2 | C2 | RG2 | P2 | S3 | C3 | RG3 | P3 | S4 | C4 | RG4 | P4 |
| F1 | N | 1.00 | 0.60 | 0.43 | -0.65 | 0.0 | 0.43 | 0.60 | 0.61 | 0.0 | 0.30 | 0.43 | 0.43 | -0.53 | 0.0 | 0.30 | 1.37 |
| | W | 2.21 | 4.42 | 2.21 | 2.21 | 3.21 | 6.42 | 3.21 | 3.21 | 2.35 | 4.69 | 2.35 | 2.35 | 0.0 | 0.0 | 0.0 | 0.0 |
| F2 | N | 1.65 | 1.00 | 0.70 | -1.08 | 0.0 | 0.70 | 1.00 | 1.02 | 0.0 | 0.50 | 0.70 | 0.72 | -0.88 | 0.0 | 0.50 | 2.27 |
| | W | 0.0 | 0.00 | 0.00 | 0.00 | 1.00 | 2.00 | 1.00 | 1.00 | 1.42 | 2.84 | 1.42 | 1.42 | 0.0 | 0.00 | 0.00 | 0.00 |
| F3 | N | 1.00 | 0.74 | 0.63 | -0.42 | 0.35 | 0.63 | 0.74 | 0.40 | 0.35 | 0.54 | 0.63 | 0.28 | 0.0 | 0.35 | 0.54 | 0.89 |
| | W | 2.21 | 4.42 | 2.21 | 2.21 | 3.21 | 6.42 | 3.21 | 3.21 | 2.35 | 4.69 | 2.35 | 2.35 | 1.49 | 2.98 | 1.49 | 1.49 |
| F4 | N | 2.35 | 1.42 | 1.00 | -1.53 | 0.0 | 1.00 | 1.42 | 1.44 | 0.0 | 0.70 | 1.00 | 1.02 | -1.25 | 0.0 | 0.70 | 3.22 |
| | W | 0.0 | 0.00 | 0.00 | 0.00 | 0.00 | 0.00 | 0.00 | 0.00 | 1.00 | 2.00 | 1.00 | 1.00 | 0.0 | 0.00 | 0.00 | 0.00 |
| F5 | N | 1.35 | 1.00 | 0.84 | -0.57 | 0.47 | 0.84 | 1.00 | 0.54 | 0.47 | 0.73 | 0.84 | 0.38 | 0.0 | 0.47 | 0.73 | 1.20 |
| | W | 0.0 | 0.00 | 0.00 | 0.00 | 1.00 | 2.00 | 1.00 | 1.00 | 1.42 | 2.84 | 1.42 | 1.42 | 0.65 | 1.30 | 0.65 | 0.65 |
| F6 | N | 1.60 | 1.19 | 1.00 | -0.68 | 0.56 | 1.00 | 1.19 | 0.64 | 0.56 | 0.87 | 1.00 | 0.45 | 0.0 | 0.56 | 0.87 | 1.43 |
| | W | 0.0 | 0.00 | 0.00 | 0.00 | 0.00 | 0.00 | 0.00 | 0.00 | 1.00 | 2.00 | 1.00 | 1.00 | 0.27 | 0.54 | 0.27 | 0.27 |
| F8 | N | 0.0 | 0.69 | 1.00 | 1.14 | 1.74 | 1.00 | 0.69 | -1.07 | 1.74 | 1.22 | 1.00 | -0.76 | 2.67 | 1.74 | 1.22 | -2.39 |
| | W | 0.40 | 0.80 | 0.40 | 0.40 | 0.58 | 1.16 | 0.58 | 0.58 | 0.58 | 1.16 | 0.58 | 0.58 | 0.0 | 0.00 | 0.00 | 0.00 |
| F9 | N | 0.0 | 1.00 | 1.45 | 1.65 | 2.53 | 1.45 | 1.00 | -1.56 | 2.53 | 1.77 | 1.45 | -1.10 | 3.88 | 2.53 | 1.77 | -3.47 |
| | W | 0.96 | 1.93 | 0.96 | 0.96 | 0.40 | 0.80 | 0.40 | 0.40 | 0.40 | 0.80 | 0.40 | 0.40 | 0.0 | 0.00 | 0.00 | 0.00 |
| R1 | N | 1.00 | 0.31 | 0.0 | -1.14 | -0.74 | 0.0 | 0.31 | 1.07 | -0.74 | -0.22 | 0.0 | 0.76 | -1.67 | -0.74 | -0.22 | 2.39 |
| | W | 2.21 | 4.42 | 2.21 | 2.21 | 3.21 | 6.42 | 3.21 | 3.21 | 3.21 | 6.42 | 3.21 | 3.21 | 0.0 | 0.00 | 0.00 | 0.00 |

FIG.5C

| A | B | X 1 ||| X 2 |||||| X 3 |||||| X 4 ||||
|---|---|---|---|---|---|---|---|---|---|---|---|---|---|---|---|---|---|---|---|---|
|   |   | S1 | C1 | RG1 | P1 | S2 | C2 | RG2 | P2 | S3 | C3 | RG3 | P3 | S4 | C4 | RG4 | P4 |
| F1 | N | 1.00 | 0.60 | 0.43 | -0.65 | 0.00 | 0.43 | 0.60 | 0.61 | 0.00 | 0.30 | 0.43 | 0.43 | 0.30 | 0.00 | -0.17 | -0.77 |
|    | W | 2.21 | 4.42 | 2.21 | 2.21 | 3.21 | 6.42 | 3.21 | 3.21 | 2.35 | 4.69 | 2.35 | 2.35 | 0.00 | 0.00 | 0.00 | 0.00 |
| F2 | N | 1.00 | 0.66 | 0.51 | -0.56 | 0.14 | 0.51 | 0.66 | 0.53 | 0.14 | 0.40 | 0.51 | 0.37 | 0.40 | 0.14 | 0.0 | -0.66 |
|    | W | 2.21 | 4.42 | 2.21 | 2.21 | 3.21 | 6.42 | 3.21 | 3.21 | 2.35 | 4.69 | 2.35 | 2.35 | 1.49 | 2.98 | 1.49 | 1.49 |
| F3 | N | 1.65 | 1.00 | 0.70 | -1.08 | 0.00 | 0.70 | 1.00 | 1.02 | 0.00 | 0.50 | 0.70 | 0.72 | 0.50 | 0.00 | -0.28 | -1.27 |
|    | W | 0.0 | 0.00 | 0.00 | 0.00 | 1.00 | 2.00 | 1.00 | 1.00 | 1.42 | 2.84 | 1.42 | 1.42 | 0.00 | 0.00 | 0.00 | 0.00 |
| F4 | N | 1.51 | 1.00 | 0.77 | -0.84 | 0.22 | 0.77 | 1.00 | 0.79 | 0.22 | 0.61 | 0.77 | 0.56 | 0.61 | 0.22 | 0.0 | -1.00 |
|    | W | 0.0 | 0.00 | 0.00 | 0.00 | 1.00 | 2.00 | 1.00 | 1.00 | 1.42 | 2.84 | 1.42 | 1.42 | 0.65 | 1.30 | 0.65 | 0.65 |
| F5 | N | 2.35 | 1.42 | 1.00 | -1.53 | 0.00 | 1.00 | 1.42 | 1.44 | 0.00 | 0.70 | 1.00 | 1.02 | 0.70 | 0.00 | -0.40 | -1.81 |
|    | W | 0.0 | 0.00 | 0.00 | 0.00 | 0.00 | 1.00 | 0.00 | 0.00 | 1.00 | 2.00 | 1.00 | 1.00 | 0.0 | 0.0 | 0.0 | 0.0 |
| F6 | N | 1.96 | 1.30 | 1.00 | -1.10 | 0.28 | 1.00 | 1.30 | 1.03 | 0.28 | 0.79 | 1.00 | 0.73 | 0.79 | 0.28 | 0.0 | -1.30 |
|    | W | 0.0 | 0.0 | 0.0 | 0.0 | 0.0 | 0.0 | 0.0 | 0.0 | 1.00 | 2.00 | 1.00 | 1.00 | 0.27 | 0.54 | 0.27 | 0.27 |
| F8 | N | 0.0 | 0.69 | 1.00 | 1.14 | 1.74 | 1.00 | 0.69 | -1.07 | 1.74 | 1.22 | 1.00 | -0.76 | 1.22 | 1.74 | 2.04 | 1.34 |
|    | W | 0.40 | 0.80 | 0.40 | 0.40 | 0.58 | 1.16 | 0.58 | 0.58 | 0.58 | 1.16 | 0.58 | 0.58 | 0.00 | 0.00 | 0.00 | 0.00 |
| F9 | N | 0.0 | 1.00 | 1.45 | 1.65 | 2.53 | 1.45 | 1.00 | -1.56 | 2.53 | 1.77 | 1.45 | -1.10 | 1.77 | 2.53 | 2.96 | 1.95 |
|    | W | 0.96 | 1.93 | 0.96 | 0.96 | 0.40 | 0.80 | 0.40 | 0.40 | 0.40 | 0.80 | 0.40 | 0.40 | 0.00 | 0.00 | 0.00 | 0.00 |
| R1 | N | 1.00 | 0.31 | 0.0 | -1.14 | -0.74 | 0.00 | 0.31 | 1.07 | -0.74 | -0.22 | 0.00 | 0.76 | -0.22 | -0.74 | -1.04 | -1.34 |
|    | W | 2.21 | 4.42 | 2.21 | 2.21 | 3.21 | 6.42 | 3.21 | 3.21 | 3.21 | 6.42 | 3.21 | 3.21 | 0.0 | 0.0 | 0.0 | 0.0 |
| R2 | N | 3.21 | 1.00 | 0.0 | -3.65 | -2.39 | 0.00 | 1.00 | 3.44 | -2.39 | -0.70 | 0.00 | 2.43 | -0.70 | -2.39 | -3.33 | -4.32 |
|    | W | 0.0 | 0.00 | 0.00 | 0.00 | 1.00 | 2.00 | 1.00 | 1.00 | 1.00 | 2.00 | 1.00 | 1.00 | 0.0 | 0.0 | 0.0 | 0.0 |

FIG.6C

| A | B | \multicolumn{4}{c|}{X1} | \multicolumn{4}{c|}{X2} | \multicolumn{4}{c|}{X3} | \multicolumn{4}{c|}{X4} |
|---|---|------|------|------|------|------|------|------|------|------|------|------|------|------|------|------|------|
|   |   | S1 | C1 | RG1 | P1 | S2 | C2 | RG2 | P2 | S3 | C3 | RG3 | P3 | S4 | C4 | RG4 | P4 |
| F1 | N | 1.00 | 0.60 | 0.43 | -0.65 | 0.0 | 0.43 | 0.60 | 0.61 | 0.0 | 0.30 | 0.43 | 0.43 | 0.0 | 0.30 | 0.43 | 0.47 |
| F1 | W | 2.21 | 4.42 | 2.21 | 2.21 | 3.21 | 6.42 | 3.21 | 3.21 | 2.35 | 4.69 | 2.35 | 2.35 | 0.0 | 0.0 | 0.0 | 0.0 |
| F2 | N | 1.65 | 1.00 | 0.70 | -1.08 | 0.0 | 0.70 | 1.00 | 1.02 | 0.0 | 0.50 | 0.70 | 0.72 | 0.0 | 0.50 | 0.71 | 0.77 |
| F2 | W | 0.0 | 0.00 | 0.00 | 0.00 | 1.00 | 2.00 | 1.00 | 1.00 | 1.42 | 2.84 | 1.42 | 1.42 | 0.0 | 0.0 | 0.0 | 0.0 |
| F3 | N | 2.35 | 1.42 | 1.00 | -1.53 | 0.0 | 1.00 | 1.42 | 1.44 | 0.0 | 0.70 | 1.00 | 1.02 | 0.0 | 0.70 | 1.01 | 1.09 |
| F3 | W | 0.0 | 0.00 | 0.00 | 0.00 | 0.00 | 0.00 | 0.00 | 0.00 | 1.00 | 2.00 | 1.00 | 1.00 | 0.0 | 0.0 | 0.0 | 0.0 |
| F5 | N | 0.0 | 0.69 | 1.00 | 1.14 | 1.74 | 1.00 | 0.69 | -1.07 | 1.74 | 1.22 | 1.00 | -0.76 | 1.74 | 1.22 | 0.99 | -0.81 |
| F5 | W | 0.40 | 0.80 | 0.40 | 0.40 | 0.58 | 1.16 | 0.58 | 0.58 | 0.58 | 1.16 | 0.58 | 0.58 | 0.00 | 0.0 | 0.0 | 0.0 |
| F6 | N | 0.0 | 1.00 | 1.45 | 1.65 | 2.53 | 1.45 | 1.00 | -1.56 | 2.53 | 1.77 | 1.45 | -1.10 | 2.53 | 1.77 | 1.44 | -1.18 |
| F6 | W | 0.96 | 1.93 | 0.96 | 0.96 | 0.40 | 0.80 | 0.40 | 0.40 | 0.40 | 0.80 | 0.40 | 0.40 | 0.00 | 0.0 | 0.0 | 0.0 |
| R1 | N | 1.00 | 0.31 | 0.0 | -1.14 | -0.74 | 0.00 | 0.31 | 1.07 | -0.74 | -0.22 | 0.00 | 0.76 | -0.74 | -0.22 | 0.01 | 0.81 |
| R1 | W | 2.21 | 4.42 | 2.21 | 2.21 | 3.21 | 6.42 | 3.21 | 3.21 | 3.21 | 6.42 | 3.21 | 3.21 | 0.00 | 0.0 | 0.0 | 0.0 |
| R2 | N | 1.00 | 0.30 | -0.01 | -1.15 | -0.76 | -0.01 | 0.30 | 1.08 | -0.76 | -0.23 | -0.01 | 0.76 | -0.76 | -0.23 | 0.00 | 0.82 |
| R2 | W | 2.21 | 4.42 | 2.21 | 2.21 | 3.21 | 6.42 | 3.21 | 3.21 | 2.35 | 4.69 | 2.35 | 2.35 | 5.33 | 10.66 | 5.33 | 5.33 |
| R3 | N | 3.21 | 1.00 | 0.0 | -3.65 | -2.39 | 0.00 | 1.00 | 3.44 | -2.39 | -0.70 | 0.00 | 2.43 | -2.39 | -0.70 | 0.03 | 2.61 |
| R3 | W | 0.0 | 0.00 | 0.00 | 0.00 | 1.00 | 2.00 | 1.00 | 1.00 | 1.00 | 2.00 | 1.00 | 1.00 | 0.00 | 0.0 | 0.0 | 0.0 |
| R4 | N | 3.28 | 1.00 | -0.03 | -3.76 | -2.49 | -0.03 | 1.00 | 3.55 | -2.49 | -0.76 | -0.03 | 2.50 | -2.49 | -0.76 | 0.0 | 2.69 |
| R4 | W | 0.0 | 0.00 | 0.00 | 0.00 | 1.00 | 2.00 | 1.00 | 1.00 | 1.42 | 2.84 | 1.42 | 1.42 | 2.32 | 4.64 | 2.32 | 2.32 |

FIG.7C

| A | B | X1 | | | | X2 | | | | X3 | | | | X4 | | | |
|---|---|---|---|---|---|---|---|---|---|---|---|---|---|---|---|---|---|
| | | S1 | C1 | RG1 | P1 | S2 | C2 | RG2 | P2 | S3 | C3 | RG3 | P3 | S4 | C4 | RG4 | P4 |
| F1 | N | 1.00 | 0.60 | 0.43 | -0.65 | 0.0 | 0.43 | 0.60 | 0.61 | 0.0 | 0.30 | 0.43 | 0.43 | 0.83 | 0.30 | 0.0 | -1.37 |
| | W | 2.21 | 4.42 | 2.21 | 2.21 | 3.21 | 6.42 | 3.21 | 3.21 | 2.35 | 4.69 | 2.35 | 2.35 | 0.0 | 0.0 | 0.0 | 0.0 |
| F2 | N | 1.65 | 1.00 | 0.70 | -1.08 | 0.0 | 0.70 | 1.00 | 1.02 | 0.0 | 0.50 | 0.70 | 0.72 | 1.38 | 0.50 | 0.0 | -2.27 |
| | W | 0.0 | 0.00 | 0.00 | 0.00 | 1.00 | 2.00 | 1.00 | 1.00 | 1.42 | 2.84 | 1.42 | 1.42 | 0.0 | 0.0 | 0.0 | 0.0 |
| F3 | N | 2.35 | 1.42 | 1.00 | -1.53 | 0.0 | 0.00 | 1.42 | 1.44 | 0.0 | 0.70 | 1.00 | 1.02 | 1.96 | 0.70 | 0.0 | -3.22 |
| | W | 0.0 | 0.00 | 0.00 | 0.00 | 0.00 | 0.00 | 0.00 | 0.00 | 1.00 | 2.00 | 1.00 | 1.00 | 0.0 | 0.0 | 0.0 | 0.0 |
| F5 | N | 0.0 | 0.69 | 1.00 | 1.14 | 1.74 | 1.00 | 0.69 | -1.07 | 1.74 | 1.22 | 1.00 | -0.76 | 0.29 | 1.22 | 1.74 | 2.39 |
| | W | 0.40 | 0.80 | 0.40 | 0.40 | 0.58 | 1.16 | 0.58 | 0.58 | 0.58 | 1.16 | 0.58 | 0.58 | 0.0 | 0.0 | 0.0 | 0.0 |
| F6 | N | -0.40 | 0.56 | 1.00 | 1.60 | 2.04 | 1.00 | 0.56 | -1.50 | 2.04 | 1.31 | 1.00 | -1.06 | 0.0 | 1.31 | 2.04 | 3.36 |
| | W | 0.0 | 0.0 | 0.0 | 0.0 | 0.0 | 0.0 | 0.0 | 0.0 | 1.00 | 2.00 | 1.00 | 1.00 | 0.42 | 0.84 | 0.42 | 0.42 |
| F7 | N | 0.0 | 1.00 | 1.45 | 1.65 | 2.53 | 1.45 | 1.00 | -1.56 | 2.53 | 1.77 | 1.45 | -1.10 | 0.42 | 1.77 | 2.53 | 3.47 |
| | W | 0.96 | 1.98 | 0.96 | 0.96 | 0.40 | 0.80 | 0.40 | 0.40 | 0.40 | 0.80 | 0.40 | 0.40 | 0.0 | 0.0 | 0.0 | 0.0 |
| R1 | N | 1.00 | 0.31 | 0.0 | -1.14 | -0.74 | 0.0 | 0.31 | 1.07 | -0.74 | -0.22 | 0.0 | 0.76 | 0.71 | -0.22 | -0.74 | -2.39 |
| | W | 2.21 | 4.42 | 2.21 | 2.21 | 3.21 | 6.42 | 3.21 | 3.21 | 3.21 | 6.42 | 3.21 | 3.21 | 0.0 | 0.0 | 0.0 | 0.0 |

FIG. 8C

| A \ B | | S1 | C1 | RG1 | P1 | S2 | C2 | RG2 | P2 | S3 | C3 | RG3 | P3 | S4 | C4 | RG4 | P4 |
|---|---|---|---|---|---|---|---|---|---|---|---|---|---|---|---|---|---|
| | | \multicolumn{4}{X1} | | \multicolumn{4}{X2} | | \multicolumn{4}{X3} | | \multicolumn{4}{X4} | |
| F1 | N | 1.00 | 0.60 | 0.43 | -0.65 | 0.0 | 0.43 | 0.60 | 0.61 | 0.0 | 0.30 | 0.43 | 0.43 | -0.15 | 0.30 | 0.43 | 0.35 |
| | W | 2.21 | 4.42 | 2.21 | 2.21 | 3.21 | 6.42 | 3.21 | 3.21 | 2.35 | 4.69 | 2.35 | 2.35 | 0.0 | 0.00 | 0.00 | 0.00 |
| F2 | N | 1.65 | 1.00 | 0.70 | -1.08 | 0.0 | 0.70 | 1.00 | 1.02 | 0.0 | 0.50 | 0.70 | 0.72 | -0.25 | 0.50 | 0.70 | 0.58 |
| | W | 0.0 | 0.00 | 0.00 | 0.00 | 1.00 | 2.00 | 1.00 | 1.00 | 1.42 | 2.84 | 1.42 | 1.42 | 0.0 | 0.00 | 0.00 | 0.00 |
| F3 | N | 1.52 | 1.00 | 0.76 | -0.86 | 0.20 | 0.76 | 1.00 | 0.82 | 1.42 | 0.60 | 0.76 | 0.57 | 0.0 | 0.60 | 0.76 | 0.46 |
| | W | 0.0 | 0.00 | 0.00 | 0.00 | 1.00 | 2.00 | 1.00 | 1.00 | 0.20 | 2.00 | 1.00 | 1.00 | 2.42 | 4.84 | 2.42 | 2.42 |
| F4 | N | 2.35 | 1.42 | 1.00 | -1.53 | 0.0 | 1.00 | 1.42 | 1.44 | 0.0 | 0.70 | 1.00 | 1.02 | -0.35 | 0.70 | 1.00 | 0.82 |
| | W | 0.0 | 0.00 | 0.00 | 0.00 | 0.00 | 0.00 | 0.00 | 0.00 | 1.00 | 2.00 | 1.00 | 1.00 | 0.0 | 0.0 | 0.0 | 0.0 |
| F5 | N | 2.00 | 1.31 | 1.00 | -1.13 | 0.26 | 1.00 | 1.31 | 1.07 | 0.26 | 0.78 | 1.00 | 0.75 | 0.0 | 0.78 | 1.00 | 0.61 |
| | W | 0.0 | 0.00 | 0.00 | 0.00 | 0.00 | 0.00 | 0.00 | 0.00 | 0.00 | 0.00 | 0.00 | 0.00 | 1.00 | 2.00 | 1.00 | 1.00 |
| F7 | N | 0.0 | 0.69 | 1.00 | 1.14 | 1.74 | 1.00 | 0.69 | -1.07 | 1.74 | 1.22 | 1.00 | -0.76 | 2.00 | 1.22 | 1.00 | -0.61 |
| | W | 0.40 | 0.80 | 0.40 | 0.40 | 0.58 | 1.16 | 0.58 | 0.58 | 0.58 | 1.16 | 0.58 | 0.58 | 0.0 | 0.00 | 0.00 | 0.00 |
| F8 | N | 0.0 | 1.00 | 1.45 | 1.65 | 2.53 | 1.45 | 1.00 | -1.56 | 2.53 | 1.77 | 1.45 | -1.10 | 2.91 | 1.77 | 1.45 | -0.88 |
| | W | 0.96 | 1.93 | 0.96 | 0.96 | 0.40 | 0.80 | 0.40 | 0.40 | 0.40 | 0.80 | 0.40 | 0.40 | 0.0 | 0.00 | 0.00 | 0.00 |
| R1 | N | 1.00 | 0.31 | 0.0 | -1.14 | -0.74 | 0.0 | 0.31 | 1.07 | -0.74 | -0.22 | 0.00 | 0.76 | -1.00 | -0.22 | 0.00 | 0.61 |
| | W | 2.21 | 4.42 | 2.21 | 2.21 | 3.21 | 6.42 | 3.21 | 3.21 | 3.21 | 6.42 | 3.21 | 3.21 | 0.0 | 0.0 | 0.0 | 0.0 |
| R2 | N | 3.21 | 1.00 | 0.0 | -3.65 | -2.39 | 0.00 | 1.00 | 3.44 | -2.39 | -0.70 | 0.0 | 2.43 | -3.22 | -0.70 | 0.0 | 1.96 |
| | W | 0.0 | 0.00 | 0.00 | 0.00 | 1.00 | 2.00 | 1.00 | 1.00 | 1.00 | 2.00 | 1.00 | 1.00 | 0.0 | 0.0 | 0.0 | 0.0 |

FIG.9C

| A | B | X1 | | | | X2 | | | | X3 | | | | X4 | | | |
|---|---|------|------|------|------|------|------|------|------|------|------|------|------|------|------|------|------|
|   |   | S1 | C1 | RG1 | P1 | S2 | C2 | RG2 | P2 | S3 | C3 | RG3 | P3 | S4 | C4 | RG4 | P4 |
| F1 | N | 1.00 | 0.46 | 0.22 | -0.89 | -0.36 | 0.22 | 0.46 | 0.84 | -0.36 | 0.05 | 0.22 | 0.59 | 0.22 | 0.05 | 0.0 | -0.13 |
|    | W | 2.21 | 4.42 | 2.21 | 2.21 | 3.21 | 6.42 | 3.21 | 3.21 | 3.21 | 6.42 | 3.21 | 3.21 | 19.85 | 39.70 | 19.85 | 19.85 |
| F2 | N | 2.16 | 1.00 | 0.47 | -1.92 | -0.78 | 0.47 | 1.00 | 1.81 | -0.78 | 0.10 | 0.47 | 1.28 | 0.47 | 0.10 | 0.0 | -0.29 |
|    | W | 0.0 | 0.00 | 0.00 | 0.00 | 1.00 | 2.00 | 1.00 | 1.00 | 1.00 | 2.00 | 1.00 | 1.00 | 8.64 | 17.28 | 8.64 | 8.64 |
| F3 | N | 1.00 | 0.60 | 0.43 | -0.65 | 0.0 | 0.43 | 0.60 | 0.61 | 0.0 | 0.30 | 0.43 | 0.43 | 0.43 | 0.30 | 0.27 | -0.10 |
|    | W | 2.21 | 4.42 | 2.21 | 2.21 | 3.21 | 6.42 | 3.21 | 3.21 | 2.35 | 4.69 | 2.35 | 2.35 | 0.0 | 0.0 | 0.0 | 0.0 |
| F4 | N | 1.65 | 1.00 | 0.70 | -1.08 | 0.0 | 0.70 | 1.00 | 1.02 | 0.0 | 0.50 | 0.70 | 0.72 | 0.70 | 0.50 | 0.44 | -0.16 |
|    | W | 0.0 | 0.00 | 0.00 | 0.00 | 1.00 | 2.00 | 1.00 | 1.00 | 1.42 | 2.84 | 1.42 | 1.42 | 0.0 | 0.0 | 0.0 | 0.0 |
| F5 | N | 2.35 | 1.42 | 1.00 | -1.53 | 0.0 | 1.00 | 1.42 | 1.44 | 0.0 | 0.70 | 1.00 | 1.02 | 1.00 | 0.70 | 0.62 | -0.23 |
|    | W | 0.0 | 0.00 | 0.00 | 0.00 | 0.0 | 0.00 | 0.00 | 0.00 | 1.00 | 2.00 | 1.00 | 1.00 | 0.0 | 0.0 | 0.0 | 0.0 |
| F7 | N | 0.0 | 0.69 | 1.00 | 1.14 | 1.74 | 1.00 | 0.69 | -1.07 | 1.74 | 1.22 | 1.00 | -0.76 | 1.00 | 1.22 | 1.28 | 0.17 |
|    | W | 0.40 | 0.80 | 0.40 | 0.40 | 0.58 | 1.16 | 0.58 | 0.58 | 0.58 | 1.16 | 0.58 | 0.58 | 0.0 | 0.0 | 0.0 | 0.0 |
| F8 | N | 0.0 | 1.00 | 1.45 | 1.65 | 2.53 | 1.45 | 1.00 | -1.56 | 2.53 | 1.77 | 1.45 | -1.10 | 1.45 | 1.77 | 1.86 | 0.25 |
|    | W | 0.96 | 1.93 | 0.96 | 0.96 | 0.40 | 0.80 | 0.40 | 0.40 | 0.40 | 0.80 | 0.40 | 0.40 | 0.0 | 0.0 | 0.0 | 0.0 |
| R1 | N | 1.00 | 0.31 | 0.0 | -1.14 | -0.74 | 0.0 | 0.31 | 1.07 | -0.74 | -0.22 | 0.00 | 0.76 | 0.0 | -0.22 | -0.28 | -0.17 |
|    | W | 2.21 | 4.42 | 2.21 | 2.21 | 3.21 | 6.42 | 3.21 | 3.21 | 3.21 | 6.42 | 3.21 | 3.21 | 0.0 | 0.0 | 0.0 | 0.0 |
| R2 | N | 3.21 | 1.00 | 0.0 | -3.65 | -2.39 | 0.0 | 1.00 | 3.44 | -2.39 | -0.70 | 0.00 | 2.43 | 0.00 | -0.70 | -0.90 | -0.55 |
|    | W | 0.0 | 0.00 | 0.00 | 0.00 | 1.00 | 2.00 | 1.00 | 1.00 | 1.00 | 2.00 | 1.00 | 1.00 | 0.0 | 0.0 | 0.0 | 0.0 |

SPEED CHANGE GEAR SYSTEM

BACKGROUND OF THE INVENTION

1. Field of the Invention

The present invention relates generally to speed change gear systems and more particularly to a speed change gear system which is suitable for application within fluid couplings or torque converters utilized upon motor vehicles, especially automobiles.

2. Description of the Prior Art

It is desirable that the auxiliary speed change gear system incorporated within automatic transmissions to be utilized upon large automotive vehicles, such as for example, trucks and buses, should have at least four speed shifts, and this may be realized by suitably combining three, four, or even more, sets of simple, single-pinion or double-pinion type planetary gear sets. The combination of these gears may be widely varied, but within any one particular combination, the following conditions should always be satisfied:

1. The output shaft should be coupled to the same elements within each speed range.
2. In order to reduce the circumferential speed of the bearings of each element of the planetary gear set, the number of revolutions should be small.
3. The tooth load, that is, the tangential force of each element should be small so as to maintain the strength of the gear teeth.
4. The gear set should meet the meshing conditions for the number of teeth employed. More particularly, the sun gear, whose diameter is to be minimized, as well as each planetary pinion gear, should have the necessary number of teeth.
5. With each planetary gear set, the coupling relationship among the elements should be simple and the distance from each other should be small.
6. During speed shifts wherein frictional coupling means are utilized during forward drive, such speed shifts should be available through one coupling means alone.

Present speed change gear systems do not satisfactorily attain all of the above-noted conditions with the requisite efficiency.

SUMMARY OF THE INVENTION

Accordingly, it is an object of the present invention to provide an efficient speed change gear system which provides at least four speed ranges for forward drive and one speed range for reverse drive by the use of a plurality of simple, planetary gear sets of the single pinion type.

BRIEF DESCRIPTION OF THE DRAWINGS

Various other objects, features and attendant advantages of the present invention will be more fully appreciated as the same becomes better understood from the following detailed description when considered in conjunction with the accompanying drawings, in which like reference characters designate like or corresponding parts throughout the several views and wherein:

FIG. 1B is a table which shows the relationship between the operation of the various clutches and brakes and the resulting reduction gear ratios within each speed range of the system of the first embodiment;

FIG. 2B is similar to that of FIG. 1B showing however the relationship between the clutches and brakes and the resulting gear ratios of the system of the second embodiment;

FIG. 3B is also similar to that of FIG. 1B showing however the relationship between the clutches and brakes and the resulting gear ratios of the system of the third embodiment;

FIG. 4B is similar to that of FIG. 1B showing however the relationship between the brakes and clutches and the resulting gear ratios of the system of the fourth embodiment;

FIG. 5B is a table similar to that of FIG. 1B showing however the relationship between the operation of the brakes and clutches and the resulting gear ratios of the system of the fifth embodiment;

FIG. 6B is similar to that of FIG. 1B showing however the relationship between the brake and clutch operations, and the resulting gear ratios of the system of the sixth embodiment;

FIG. 7B is also similar to that of FIG. 1B showing however the relationship between the clutch and brake operations and the resulting gear ratios of the system of the seventh embodiment;

FIG. 8B is similar to that of FIG. 1B showing however the relationship between the clutch and brake operations and the resulting gear ratios of the system of the eighth embodiment;

FIG. 1C is a table which shows the relationship between the number of revolutions of each of the elements of the planetary gear sets and the tangential forces acting thereon within the various speed ranges of the system of the first embodiment;

FIG. 2C is a table similar to that of FIG. 1C showing however the relationship between the number of revolutions of each of the elements of the planetary gear sets and the tangential forces acting thereon within the various speed ranges of the system of the second embodiment;

FIG. 3C is also a table which is similar to that of FIG. 1C showing however the relationship between the number of revolutions and the tangential forces of each of the planetary gear set elements within the various speed ranges of the system of the third embodiment;

FIG. 4c is a table similar to that of FIG. 1C showing however the relationship between the revolutions and tangential forces of each of the planetary gear set elements within the various speed ranges of the system of the fourth embodiment;

FIG. 5C also shows a table which is similar to that of FIG. 1C however the relationship refers to the revolutions and tangential forces of the planetary gear set elements of the various speed ranges of the system of the fifth embodiment;

FIG. 6C is similar to FIG. 1C showing however the relationship between the revolutions and tangential forces of the gear set elements within the various speed ranges of the system of the sixth embodiment;

FIG. 7C is also similar to FIG. 1C however the relationship shown is between the revolutions and tangential forces of the gear set elements within the different speed ranges of the system of the seventh embodiment;

FIG. 8C is a table similar to that of FIG. 1C showing however the relationship between the revolutions and tangential forces of the gear set elements within the different speed ranges of the system of the eighth embodiment; and FIG. 9C is a table which is also similar to that of FIG. 1C showing however the relationship between the revolutions and tangential forces of the gear set elements within the different speed ranges of the system of the ninth embodiment.

DETAILED DESCRIPTION OF THE PREFERRED EMBODIMENTS

Figure 1A:
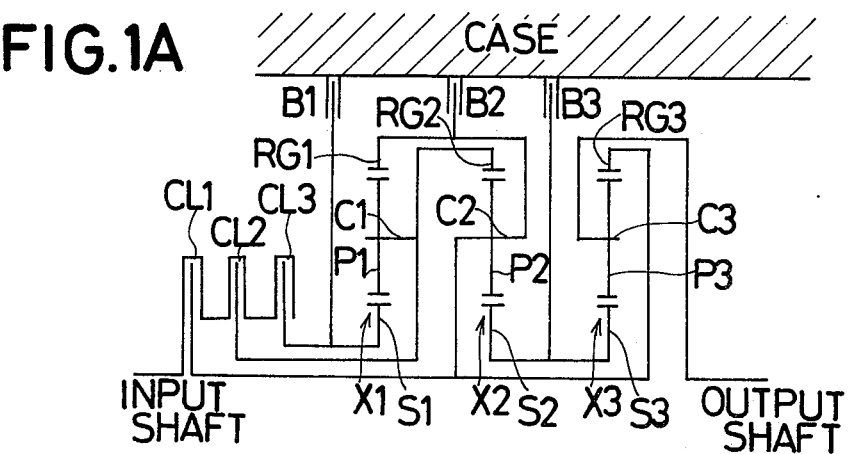
FIG. 1A is a schematic diagram of one embodiment of a speed change gear system, constructed in accordance with the present invention and showing its cooperative parts.

Referring now to the drawings and more particularly to FIG. 1A thereof, a first planetary gear set generally indicated by the reference character $X_1$ of the single-pinion type, a second planetary gear set generally indicated by the reference character $X_2$ also of the single-pinion type, and a third planetary gear set generally indicated by the reference character $X_3$ likewise of the single-pinion type are interposed between an input shaft and an output shaft.

The first planetary gear set $X_1$ includes a first sun gear $S_1$, a first planetary gear $P_1$ engaged with the first sun gear $S_1$, a first ring gear $RG_1$ enmeshed with the first planetary gear $P_1$, and a first carrier $C_1$ rotatably supporting the first planetary gear $P_1$. The second planetary gear set $X_2$ similarly includes a second sun gear $S_2$, a second planetary gear $P_2$ enmeshed with the second sun gear $S_2$, a second ring gear $RG_2$ engaged with the second planetary gear $P_2$, and a second carrier $C_2$ rotatably supporting the second planetary gear $P_2$. The third planetary gear set $X_3$ includes a third sun gear $S_3$, a third planetary gear $P_3$ enmeshed with the third sun gear $S_3$, a third ring gear $RG_3$ interengaged with the third planetary gear $P_3$, and a third carrier $C_3$ rotatably supporting the third planetary gear $P_3$, the first ring gear $RG_1$, the second carrier $C_2$ and the third ring gear $RG_2$ being drivingly connected together. The first carrier $C_1$ and the second ring gear $RG_2$ and also drivingly connected together as are the second and third sun gears $S_2$ and $S_3$, and the third carrier $C_3$ is in turn connected to the output shaft.

A first clutch $CL_1$ is provided for engaging or disengaging the input shaft and the first ring gear $RG_1$, the second carrier $C_2$, and the third ring gear $RG_3$ while a second clutch $CL_2$ is similarly provided for engaging or disengaging the input shaft and the first carrier $C_1$ and the second ring gear $RG_2$ and a third clutch $CL_3$ is also provided for engaging or disengaging the input shaft and the first sun gear $S_1$. A first brake $B_1$ is provided for fixedly locking or securing the first sun gear $S_1$ relative to the gear casing and a second brake $B_2$ is similarly provided for fixedly securing or locking the first ring gear $RG_1$, the second carrier $C_2$ and the third ring gear $RG_3$ relative to the casing while a third brake $B_3$ is likewise provided for fixedly locking the second and third sun gears $S_2$ and $S_3$ relative to the casing.

The following formulas are presented in connection with the first, second and third planetary gear sets $X_1$, $X_2$, $X_3$ of the speed change gear system of the present invention according to the embodiment described hereinabove:

$$NRG_1 - (1 + I_1) NC_1 + I_1 NS_1 = 0$$
$$NRG_2 - (1 + I_2) NC_2 + I_2 NS_2 = 0$$
$$NRG_3 - (1 + I_3) NC_3 + I_3 NS_3 = 0$$
$$NRG_4 - (1 + I_4) NC_4 + I_4 NS_4 = 0$$

These formulas are also applicable to all of the embodiments of the present invention, and the terms employed within such formulas have the following designated meanings:

$NRG_n$ = the number of revolutions of a particular ring gear;

$NC_n$ = the number of revolutions of a particular carrier;

$NS_n$ = the number of revolutions of a particular sun gear; and $I_n$ = the radial ratios of a particular sun gear relative to a particular ring gear, respectively.

The radial ratios within the system of the first embodiment are $I_1 = 0.452$, $I_2 = 0.419$, and $I_3 = 0.419$, and the relationship between the actuation of the clutches $CL_1$, $CL_2$ and $CL_3$ and the brakes $B_1$, $B_2$ and $B_3$ within the six forward drive speed ranges and the two reverse drive speed ranges and the reduction gear ratios obtained are presented within FIG. 1B. It is noted that the reduction gear ratio of 1.00 is obtained by employing at least two of the three clutches $CL_1$, $CL_2$ and $CL_3$ and this holds true for all the systems of the various embodiments of the present invention.

The relationship between the number of revolutions and the tangential forces characteristic of each of the speed ranges for forward and reverse drive and within each of the planetary gear sets $X_1$, $X_2$ and $X_3$ and the various elements thereof are presented within FIG. 1C. Assuming that the number of revolutions of the input shaft is 1, the number of revolutions of each of the system elements is presented as a ratio thereof and similarly, assuming the torque of the input shaft is 1 when the torque of the input shaft is applied to the ring gear, the tangential forces acting upon the various system elements are also presented as a ratio thereof, and this format holds true for all of the remaining systems disclosed within the other embodiments of the present invention. The significance of the various terms employed throughout the embodiments is as follows:

A = the particular speed range;
B = the particular planetary gear set;
N = the number of revolutions;
W = the tangential force;
$F_n$ = the particular forward drive speed range; and
$R_n$ = the particular reverse drive speed range.

More particularly, as the fourth forward drive speed range has a reduction gear ratio of 1.00, the number of revolutions N and the tangential forces W have been omitted. As the number of revolutions N of each sun gear, ring gear and carrier is 1.00 and the number of revolutions N of each planetary gear set is 0.00 within the speed range wherein the reduction gear ratio is 1.00, the tangential force W of this speed range having the reduction gear ratio of 1.00 is extremely small as compared to the tangential forces W produced within the other speed ranges.

This is due to the fact that the torque of the input shaft is transmitted to each of the elements within the other speed ranges through means of an engaging operation involving the utilization of only one clutch, however, the torque of the input shaft is divided and transmitted to two clutches as a result of the engagement of at least two clutches during the fourth forward drive speed range $F_4$ the divided torque of the input shaft than being transmitted to each of the gear system elements. As the torque of the input shaft is not divided as a result of the engaging operation of only one clutch, it is readily apparent that the tangential force of each element after division is small when compared to the direct torque transmission characteristic of the other speed ranges. The number of revolutions N and the tangential forces W of the speed ranges within which the reduction gear ratio is 1.00 will thus be omitted throughout the entire following discussion of all of the embodiments of the present invention.

Figure 2A:
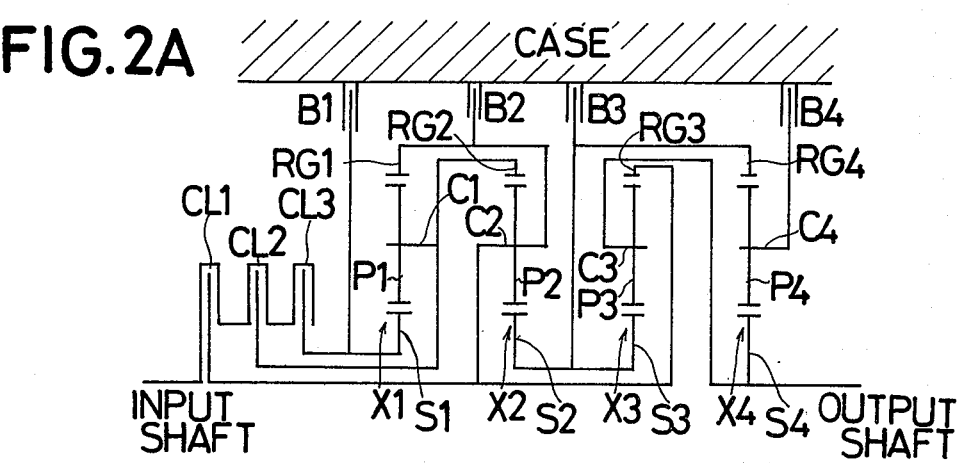
FIG. 2A is a view similar to that of FIG. 1A showing however a second embodiment of a speed change gear system constructed in accordance with the present invention.

Referring now to the second embodiment of the present invention, the system shown within FIG. 2A is similar to that of FIG. 1A, however a fourth planetary gear set generally indicated by the reference character $X_4$ has been incorporated therewithin. Gear set $X_4$ is seen to include a fourth sun gear $S_4$, and a fourth planetary gear $P_4$ enmeshed with the fourth sun gear $S_4$, a fourth ring gear $RG_4$ enmeshed with the fourth planetary gear $P_4$, and a fourth carrier $C_4$ rotatably supporting the fourth planetary gear $P_4$. The fourth sun gear $S_4$ is drivingly connected to the output shaft as is the fourth ring gear $RG_4$ with respect to the second and third sun gears $S_2$ and $S_3$. The third brake $B_3$ is also connected to the fourth ring gear $RG_4$ and the second and the third sun gears $S_2$ and $S_3$ for fixedly locking the same to the gear casing and a fourth brake $B_4$ is similarly provided for fixedly locking the fourth carrier $C_4$ to the casing.

The numerical values of the radial ratios for the speed ranges of the second embodiment derived by utilizing the formulas noted in conjunction with the discussion of the system of the first embodiment are $I_1 = 0.452$, $I_2 = 0.419$, $I_3 = 0.419$, and $I_4 = 0.562$ and the relationship between the actuation of the clutches $CL_1$, $CL_2$ and $CL_3$ and the brakes $B_1$, $B_2$, $B_3$ and $B_4$ and the resulting reduction gear ratios within the nine forward drive speed ranges and the two reverse drive speed ranges are presented within FIG. 2B, while the relationship between the number of the revolutions and the tangential forces of the elements of the planetary gears sets within the various speed ranges is presented within FIG. 2C.

Figure 3A:
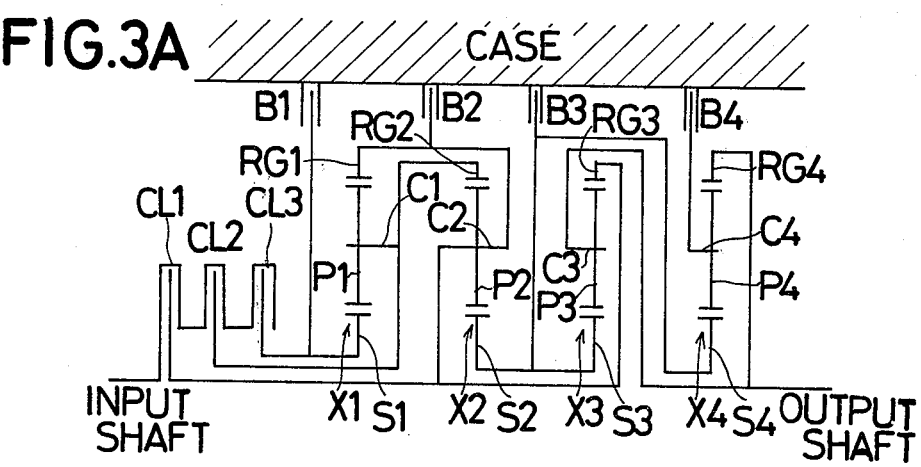
FIG. 3A is a view which is also similar to that of FIG. 1A showing however a third embodiment of a speed change gear system constructed in accordance with the present invention.

Referring now to the third embodiment of the present invention as shown within FIG. 3A, the fourth sun gear $S_4$ is drivingly connected to the second and third sun gears $S_2$ and $S_3$ while the fourth ring gear $RG_4$ is connected to the output shaft. The third brake $B_3$ is provided for fixedly securing the second, third and fourth sun gears $S_2$, and $S_3$ and $S_4$ to the gear casing and the fourth brake $B_4$ is similarly provided for fixedly securing the fourth carrier $C_4$ to the casing.

The numerical values of the radial ratios for the speed ranges of the third embodiment derived by utilizing the formulas noted in conjunction with the discussion of the system of the first embodiment are $I_1 = 0.452$, $I_2 = 0.419$, $I_3 = 0.419$, and $I_4 = 0.562$ and the relationship between the actuation of the clutches $CL_1$, $CL_2$ and $CL_3$ and the brakes $B_1$, $B_2$, $B_3$ and $B_4$ and the resulting reduction gear ratios within the nine forward drive speed ranges and the two reverse drive speed ranges are presented within FIG. 3B, while the relationship between the number of revolutions and the tangential forces of the elements of the planetary gear sets within the various speed ranges is presented within FIG. 3C.

Figure 4A:
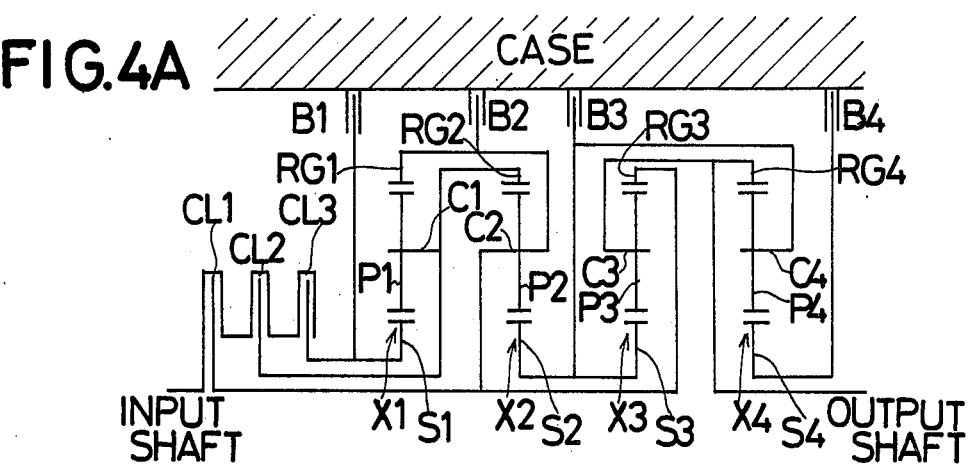
FIG. 4A is a view similar to that of FIG. 1A showing however a fourth embodiment of a speed change gear system constructed in accordance with the present invention.

Turning now to the fourth embodiment of the present invention as shown in FIG. 4A, the fourth planetary gear set $X_4$ is seen to include a fourth sun gear $S_4$, a fourth planetary gear $P_4$ enmeshed with the fourth sun gear $S_4$, a fourth ring gear $RG_4$ intermeshed with the fourth planetary gear $P_4$, and a fourth carrier $C_4$ rotatably supporting the fourth planetary gear $P_4$. The fourth ring gear $RG_4$ is drivingly connected with the output shaft and the third carrier, and the fourth carrier $C_4$ is similarly connected with the second and third sun gears $S_2$ and $S_3$. The third brake $B_3$ is provided for fixedly locking the fourth carrier $C_4$ and the second and third sun gears $S_2$ and $S_3$ to the gear casing and the fourth brake $B_4$ is likewise provided for fixedly securing the fourth sun gear $S_4$ to the casing.

The numerical values of the radial ratios for the speed ranges of the fourth embodiment derived by utilizing the formulas noted in connection with the discussion of the system of the first embodiment are $I_1 = 0.452$, $I_2 = 0.419$, $I_3 = 0.419$, and $I_4 = 0.562$ and the relationship between the actuation of the clutches $CL_1$, $CL_2$ and $CL_3$ and the brakes $B_1$, $B_2$, $B_3$ and $B_4$ and the resulting reduction gear ratios within the nine forward drive speed ranges and the one reverse drive speed range is presented within FIG. 4B while the relationship between the number of revolutions and the tangential forces of the elements of the planetary gear sets within the various speed ranges is presented within FIG. 4C.

Figure 5A:
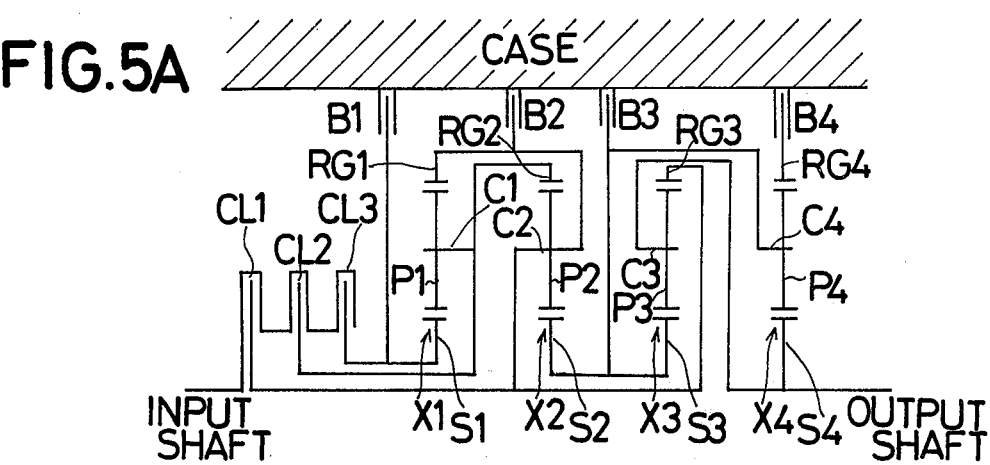
FIG. 5A is a view which is also similar to that of FIG. 1A showing however a fifth embodiment of a speed change gear system constructed in accordance with the present invention.

Referring now to the fifth embodiment of the present invention as seen in FIG. 5A, the fourth planetary gear set $X_4$ includes a fourth sun gear $S_4$, a fourth planetary gear $P_4$ enmeshed with the fourth sun gear $S_4$, a fourth ring gear $RG_4$ intermeshed with the fourth planetary gear $P_4$, and a fourth carrier $C_4$ rotatably supporting the fourth planetary gear $P_4$. The fourth sun gear $S_4$ is drivingly connected with the output shaft and the fourth carrier $C_4$ is similarly connected with the second and third sun gears $S_2$ and $S_3$. The third brake $B_3$ is provided for fixedly securing the fourth carrier $C_4$ and the second and third sun gears $S_2$ and $S_3$ to the gear casing while the fourth brake $B_4$ is similarly provided for fixedly securing the fourth ring gear $RG_4$ to the casing.

The numerical values of the radial ratios for the speed ranges of the fifth embodiment derived by utilizing the formulas noted in connection with the discussion of the system of the first embodiment are $I_1 = 0.452$, $I_2 = 0.419$, $I_3 = 0.419$ and $I_4 = 0.562$ and the relationship between the actuation of the clutches $CL_1$, $CL_2$ and $CL_3$ and the brakes $B_1$, $B_2$, $B_3$, $B_4$ and the resulting reduction gear ratios within the nine forward drive speed ranges and the two reverse drive speed ranges is presented within FIG. 5B while the relationship between the number of the revolutions and the tangential forces of the elements of the planetary gear sets within the various speed ranges is presented within FIG. 5C.

Figure 6A:
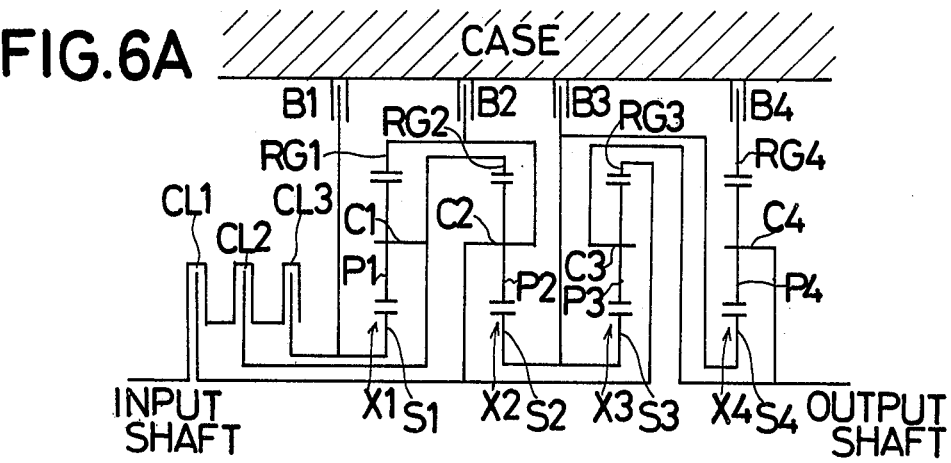
FIG. 6A is also a view which is similar to that of FIG. 1A showing however a sixth embodiment of a speed change gear system constructed in accordance with the present invention.

Referring now to the sixth embodiment of the present invention as seen in FIG. 6A, the fourth planetary gear set $X_4$ includes a fourth sun gear $S_4$, a fourth planetary gear $P_4$ enmeshed with the fourth sun gear $S_4$, a fourth ring gear $RG_4$ intermeshed with the fourth planetary gear $P_4$, and a fourth carrier $C_4$ rotatably supporting the fourth planetary gear $P_4$. The fourth carrier $C_4$ is drivingly connected with the output shaft as is the fourth sun gear $S_4$ with the second and third sun gears $S_2$ and $S_3$. The third brake $B_3$ is provided for fixedly mounting the second, third, and fourth sun gears $S_2$, $S_3$ and $S_4$ to the gear casing and the fourth brake $B_4$ is also provided for fixedly mounting the fourth ring gear $RG_4$ upon the casing.

The numerical values of the radial ratios for the speed ranges of the sixth embodiment derived by utilizing the formulas noted in conjunction with the discussion of the system of the first embodiment are $I_1 = 0.452$, $I_2 = 0.419$, $I_3 = 0.419$ and $I_4 = 0.437$ and the relationship between the actuation of the clutches $CL_1$, $CL_2$ and $CL_3$ and the brakes $B_1$, $B_2$, $B_3$ and $B_4$ and the resulting reduction gear ratios within the six forward drive speed ranges and the four reverse drive speed ranges is presented within FIG. 6B while the relationship between the number of revolutions and the tangential forces of the elements of the planetary gear sets within the various speed ranges is presented within FIG. 6C.

Figure 7A:
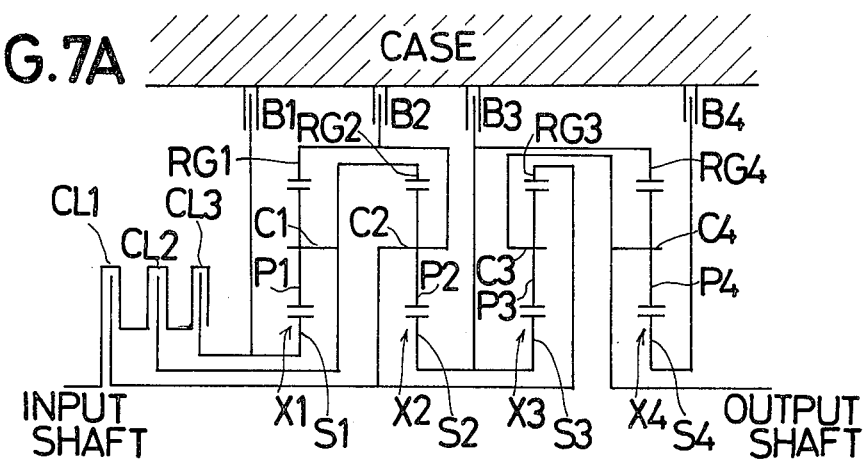
FIG. 7A is a similar to that of FIG. 1A showing however a seventh embodiment of a speed change gear system constructed in accordance with the present invention.

Considering now the seventh embodiment of the present invention as disclosed within FIG. 7A, the fourth planetary gear set $X_4$ includes a fourth sun gear $S_4$, a fourth planetary gear $P_4$ enmeshed with the fourth sun gear $S_4$, a fourth ring gear $RG_4$ intermeshed with the fourth planetary gear $P_4$, and a fourth carrier $C_4$ rotatably supporting the fourth planetary gear $P_4$. The fourth carrier $C_4$ is drivingly connected with the output shaft as well as with the third carrier $C_3$ and the fourth ring gear $RG_4$ is similarly connected with the second and third sun gears $S_2$ and $S_3$. The third brake $B_3$ is provided for fixedly mounting the fourth ring gear $RG_4$ and the second and third sun gears $S_2$ and $S_3$ upon the casing and the fourth brake $B_4$ is similarly provided for fixedly mounting the fourth sun gear $S_4$ to the casing.

The numerical values of the radial ratios for the speed ranges of the sixth embodiment derived by utilizing the formulas noted in conjunction with the description of the system of the first embodiment are $I_1 = 0.452$, $I_2 = 0.419$, $I_3 = 0.419$, and $I_4 = 0.562$ and the relationship between the actuation of the clutches $CL_1$, $CL_2$ and $CL_3$ and the brakes $B_1$, $B_2$, and $B_3$ and $B_4$ and the resulting reduction gear ratios within the seven forward drive speed ranges and one reverse drive speed range is presented within FIG. 7B while the relationship between the number of revolutions and the tangential forces of the elements of the planetary gear sets within the various speed ranges is present within FIG. 7C.

Figure 8A:
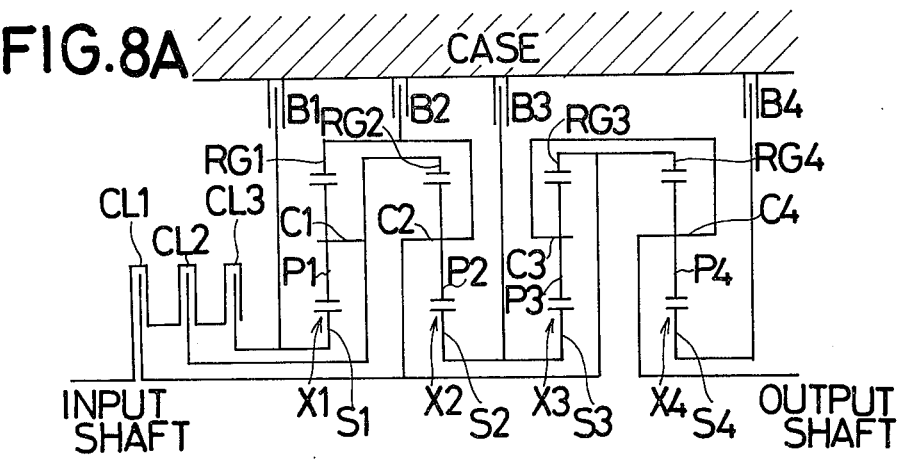
FIG. 8A is a view similar to that of FIG. 1A showing however an eighth embodiment of a speed change gear system constructed in accordance with the present invention.

Considering next the eighth embodiment of the present invention as seen within FIG. 8A, the fourth planetary gear set $X_4$ includes a fourth sun gear $S_4$, a fourth planetary gear $P_4$ engaged with the fourth sun gear $S_4$, a fourth ring gear $RG_4$ interengaged with the fourth planetary gear $P_4$, and a fourth carrier $C_4$ rotatably supporting the fourth planetary gear $P_4$. The fourth carrier $C_4$ is drivingly connected with the third carrier $C_3$ and the output shaft and the fourth ring gear $RG_4$ is similarly connected with the third ring gear $RG_3$. The fourth brake $B_4$ is provided for fixedly mounting the fourth sun gear $S_4$ upon the gear casing.

The numerical values of the radial ratios for the speed ranges of the eighth embodiment derived by utilizing the formulas noted in conjunction with the description of the system of the first embodiment are $I_1 = 0.452$, $I_2 = 0.419$, $I_3 = 0.419$, and $I_4 = 0.280$ and the relationship between the actuation of the clutches $CL_1$, $CL_2$ and $CL_3$ and the brakes $B_1$, $B_2$, $B_3$ and $B_4$ and the resulting reduction gear ratios within the eight forward drive speed ranges and the two reverse drive speed ranges is presented within FIG. 8B while the relationship between the number of revolutions and the tangential forces of the elements of the planetary gear sets within the various speed ranges is presented within FIG. 8C.

Figure 9A:
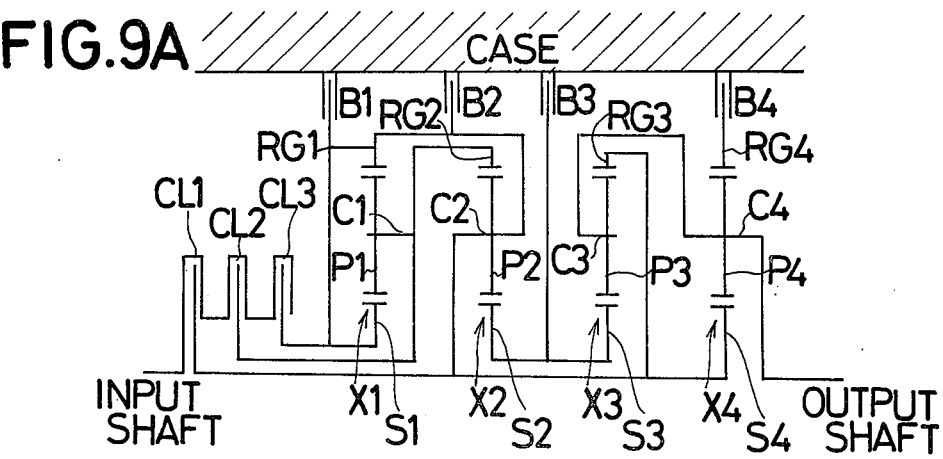
FIG. 9A is a view similar to that of FIG. 1A showing however a ninth embodiment of a speed change gear system constructed in accordance with the present invention.

Referring lastly to the ninth embodiment of the present invention as disclosed within FIG. 9A, the fourth planetary gear set $X_4$ includes a fourth sun gear $S_4$, a fourth planetary gear $P_4$ engaged with the fourth sun gear $S_4$, a fourth ring gear $RG_4$ interengaged with the fourth planetary gear $P_4$, and a fourth carrier $C_4$ rotatably supporting the fourth planetary gear $P_4$. The fourth carrier $C_4$ is drivingly connected with the third carrier $C_3$ and the output shaft, while the fourth sun gear $S_4$ is similarly connected with the third ring gear $RG_3$ and the second carrier $C_2$. The fourth brake $B_4$ is provided for fixedly mounting the fourth ring gear $RG_4$ upon the gear casing.

Figure 9B:
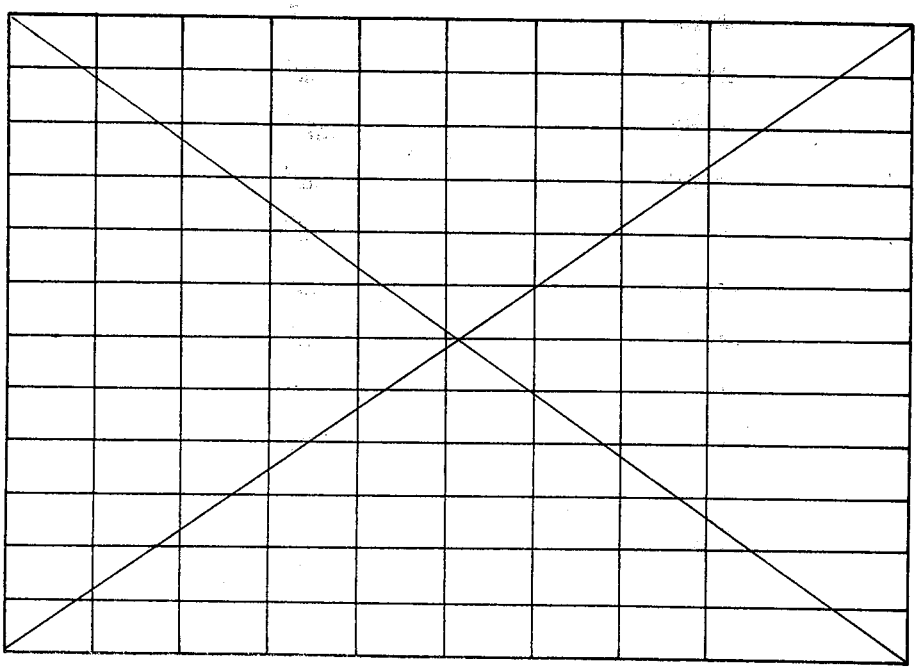
FIG. 9B is similar to that of FIG. 1B showing however the relationship between the clutch and brake operations and the resulting gear ratios of the system of the ninth embodiment.

The numerical values of the radial ratios for the speed ranges of the ninth embodiment derived by utilizing the formulas noted in conjunction with the description of the system of the first embodiment are $I_1 = 0.452$, $I_2 = 0.419$, $I_3 = 0.419$, and $I_4 = 0.280$ while the relationship between the actuation of the clutches $CL_1$, $CL_2$ and $CL_3$ and the brakes $B_2$, $B_2$, $B_3$ and $B_4$ and the resulting reduction gear ratios within the eight forward drive speed ranges and the two reverse drive speed ranges is presented within FIG. 9B, and the relationship between the number of revolutions and the tangential forces of the elements of the planetary gear sets within the various speed ranges is presented within FIG. 9C.

Thus it may be seen that the speed change gear system of the present invention has important advantages over the known prior art systems in that there has been disclosed and described a speed change gearing system capable of changing speeds between at least four forward drive speeds and one reverse drive speed through the use of simple planetary gear sets, the speed change gearing system of the present invention thereby contributing greatly to the development of mechanized industry.

Obviously, many modifications and variations of the present invention are possible in light of the above teachings. It is to be understood therefore that within the scope of the appended claims the present invention may be practiced otherwise than as specifically described herein.

What is claimed as new and desired to be secured by letters patent of the United States is:

1. A speed change gear system comprising:
   an input shaft;
   an output shaft;
   a first planetary gear set including a first sun gear, a first planetary gear meshed with said first sun gear, a first ring gear meshed with said first planetary gear, a first carrier rotatably supporting said first planetary gear;
   a second planetary gear set including a second sun gear, a second planetary gear meshed with said second sun gear, a second ring gear meshed with said second planetary gear and drivingly connected to said first carrier, and a second carrier rotatably supporting said second planetary gear and drivingly connected to said first ring gear;
   a third planetary gear set including a third sun gear drivingly connected to said second sun gear, a third planetary gear meshed with said third sun gear, a third ring gear meshed with said third planetary gear and drivingly connected to said carrier and said first ring gear, and a third carrier rotatably supporting said third planetary gear and drivingly connected to said output shaft;
   a first clutch for engaging or disengaging said input shaft and said first ring gear and said second carrier and said third ring gear;
   a second clutch for engaging or disengaging said input shaft and said first carrier and said second ring gear;
   a third clutch for engaging or disengaging said input shaft and said first sun gear;
   a first brake for fixedly mounting said first sun gear on a casing;
   a second brake for fixedly mounting said first ring gear and said second carrier and said third ring gear to said casing; and
   a third brake for fixedly mounting said second sun gear and said third sun gear to said casing.

2. A speed change gear system as set forth in claim 1, additionally comprising:
   a fourth planetary gear set including a fourth sun gear drivingly connected to said output shaft, a fourth planetary gear meshed with said fourth sun gear, a fourth ring gear meshed with said fourth planetary gear and drivingly connected to said second and third sun gears, and a fourth carrier for rotatably supporting said fourth planetary gear; and
   a fourth brake for fixedly mounting said fourth carrier on said casing.

3. A speed change gear system as set forth in claim 1, additionally comprising:
   a fourth planetary gear set including a fourth sun gear drivingly connected to said second sun gear and said third sun gear, a fourth planetary gear meshed with said fourth sun gear, a fourth ring gear meshed with said fourth planetary gear and drivingly connected to said output shaft, and a fourth carrier for rotatably supporting said fourth planetary gear; and
   a fourth brake for fixedly mounting said fourth carrier on said casing.

4. A speed change gear system as set forth in claim 1, additionally comprising:
   a fourth planetary gear set including a fourth sun gear, a fourth planetary gear meshed with said fourth sun gear, a fourth ring gear meshed with said fourth planetary gear and drivingly connected to said third carrier and said output shaft, and a fourth carrier for rotatably supporting said fourth planetary gear and drivingly connected to said second and third sun gears; and
   a fourth brake for fixedly mounting said fourth sun gear on said casing.

5. A speed change gear system as set forth in claim 1, additionally comprising:
   a fourth planetary gear set including a fourth sun gear drivingly connected to said first ring gear and said second carrier and said third ring gear, a fourth planetary gear meshed with said fourth sun gear, a fourth ring gear meshed with said fourth planetary gear, and a fourth carrier for rotatably supporting said fourth planetary gear and drivingly connected to said third carrier and said output shaft; and
   a fourth brake for fixedly mounting said fourth ring gear on said casing.

6. A speed change gear system comprising:
   an input shaft;
   an output shaft;
   a first planetary gear set including a first sun gear, a first planetary gear meshed with said first sun gear, a first ring gear meshed with said first planetary gear, a first carrier rotatably supporting said first planetary gear;
   a second planetary gear set including a second sun gear, a second planetary gear meshed with said second sun gear, a second ring gear meshed with said second planetary gear and drivingly connected to said first carrier, and a second carrier rotatably supporting said second planetary gear and drivingly connected to said first ring gear;
   a third planetary gear set including a third sun gear drivingly connected to said second sun gear, a third planetary gear meshed with said third sun gear, a third ring gear meshed with said third planetary gear and drivingly connected to said second carrier and said first ring gear, and a third carrier rotatably supporting said third planetary gear and drivingly connected to said output shaft;
   a first clutch for engaging or disengaging said input shaft and said first ring gear and said second carrier and said third ring gear;
   a second clutch for engaging or disengaging said input shaft and said first carrier and said second ring gear;
   a third clutch for engaging or disengaging said input shaft and said first sun gear;
   a brake for fixedly mounting said first ring gear and said second carrier and said third ring gear to said casing; and
   another brake for fixedly mounting said second sun gear and said third sun gear to said casing.

7. A speed change gear system as set forth in claim 6, further comprising:
   an additional brake for fixedly mounting said first sun gear upon said casing.

8. A speed change gear system as set forth in claim 6, further comprising:
   a fourth planetary gear set including a fourth sun gear drivingly connected to said output shaft, a fourth planetary gear meshed with said fourth sun gear, a fourth ring gear meshed with said fourth planetary gear and drivingly connected to said second and third sun gears, and a fourth carrier for rotatably supporting said fourth planetary gear; and a brake for fixedly mounting said fourth carrier on said casing.

9. A speed change gear system as set forth in claim 8, further comprising:

an additional brake for fixedly mounting said first sun gear upon said casing.

10. A speed change gear system as set forth in claim 6, further comprising:

a fourth planetary gear set including a fourth sun gear drivingly connected to said second sun gear and said third sun gear, a fourth planetary gear meshed with said fourth sun gear, a fourth ring gear meshed with said fourth planetary gear and drivingly connected to said output shaft, and a fourth carrier for rotatably supporting said fourth planetary gear; and a brake for fixedly mounting said fourth carrier on said casing.

11. A speed change gear system as set forth in claim 10, further comprising:

an additional brake for fixedly mounting said first sun gear upon said casing.

12. A speed change gear system as set forth in claim 6, further comprising:

a fourth planetary gear set including a fourth sun gear, a fourth planetary gear meshed with said fourth sun gear, a fourth ring gear meshed with said fourth planetary gear and drivingly connected to said third carrier and said output shaft, and a fourth carrier for rotatably supporting said fourth planetary gear and drivingly connected to said second and third sun gears; and a brake for fixedly mounting said fourth sun gear on said casing.

13. A speed change gear system as set forth in claim 12, further comprising:

an additional brake for fixedly mounting said first sun gear upon said casing.

14. A speed change gear system as set forth in claim 6, further comprising:

a fourth planetary gear set including a fourth sun gear drivingly connected to said first ring gear and said second carrier and said third ring gear, a fourth planetary gear meshed with said fourth sun gear, a fourth ring gear meshed with said fourth planetary gear, and a fourth carrier for rotatably supporting said fourth planetary gear and drivingly connected to said third carrier and said output shaft; and a brake for fixedly mounting said fourth ring gear on said casing.

15. A speed change gear system as set forth in claim 14, further comprising:

an additional brake fixedly mounting said first sun gear upon said casing.

* * * * *